United States Patent [19]

Quedens et al.

[11] Patent Number: 4,962,388
[45] Date of Patent: Oct. 9, 1990

[54] BIDIRECTIONAL FEED MECHANISM OF A FETAL MONITOR PRINTER

[75] Inventors: Phillipp J. Quedens, Berlin; Peter A. Staniforth, Killingworth, both of Conn.

[73] Assignee: American Home Products Corporation, New York, N.Y.

[21] Appl. No.: 335,286

[22] Filed: Apr. 10, 1989

[51] Int. Cl.⁵ .................... G01D 15/13; B41J 11/58
[52] U.S. Cl. ................................ 346/136; 226/91; 400/613; 346/145
[58] Field of Search ............... 346/136, 145; 226/91, 226/92, 93; 400/612, 613, 613.2, 613.4

[56] References Cited

U.S. PATENT DOCUMENTS

| | | |
|---|---|---|
| 2,718,450 | 9/1955 | Leonard . |
| 3,216,021 | 11/1965 | Stefansson . |
| 4,139,855 | 2/1979 | Marquardt . |
| 4,218,031 | 8/1980 | Camier . |
| 4,296,420 | 10/1981 | Dambach . |
| 4,348,118 | 9/1982 | Skafvenstedt . |
| 4,560,995 | 12/1985 | Suga et al. ............... 346/136 |
| 4,567,492 | 1/1986 | Skafvenstedt . |
| 4,631,552 | 12/1986 | Kobayashi . |
| 4,748,457 | 5/1988 | Quedens . |

OTHER PUBLICATIONS

Operator's Manual for the 115 Fetal Monitor by Corometrics Medical Systems (pp. 1, 9, 16-18). pp. 16-18 illustrate the paper loading procedure for the Model 115 Printer.

*Primary Examiner*—Mark J. Reinhart
*Attorney, Agent, or Firm*—Darby & Darby

[57] ABSTRACT

A feed mechanism and method for feeding zigzag paper from either side of a zigzag paper pack. Zigzag paper is inserted into a paper retention pocket in a door pivoted to a housing. The door is then closed, causing the paper pack to stand upright vertically and an end of the paper to become positioned between a drive roller and a print head and between a drag spring and guide element. The drag spring biases against the guide element and is arranged above a base of the paper retention pocket over the zigzag paper pack. The drive roller pulls the paper between the drag spring and guide element and out of the pocket.

25 Claims, 6 Drawing Sheets

BIDIRECTIONAL FEED MECHANISM OF A FETAL MONITOR PRINTER

BACKGROUND OF THE INVENTION

The present invention relates to a feed mechanism of a fetal monitor printer for feeding zigzag paper from either side of a zigzag paper pack.

Corometrics Medical Systems has sold a Model 115 fetal monitor printer that is designed to only bottom feed zigzag paper.

This printer has a housing and a door pivoted to the housing. In the door is a drive roller and a paper retention pocket. A print head with thermal fingers is provided on the housing, opposite the drive roller when the door is closed. A zigzag paper pack is inserted into the pocket when the door is open. An optical sensor is provided for detecting the end of paper of the zigzag paper pack.

In practice, the bottom sheet of the zigzag paper pack is positioned to stick out of the paper retention pocket when the pack is inserted into the pocket. The paper thus extends over the drive roller. When the door is closed and the printer operated, the drive roller will feed the paper out of the pocket from the underside of the paper pack. The print head is in position opposite the drive roller to commence printing onto the paper with its thermal fingers.

Due to the nature of the zigzag paper pack, the pack leans against a sidewall of the paper retention pocket with whichever side of the pack is not being pulled by the drive roller.

It is possible that the zigzag paper pack is improperly positioned in the pocket, because of operator error. In the rush of delivery room activity, for instance, the zigzag paper pack may be inadvertently inserted into the pocket so that its top sheet sticks out over the drive roller, rather than its bottom sheet from underneath the pack. If this occurs, subsequent operation of the printer may lead to lost data and machine stoppage, because the pack eventually becomes thin and light enough to be pulled out all at once from the pocket.

U.S. Pat. No. 4,748,457 discloses a recording device in which zigzag or Z fold paper is loaded into a tray located within the device when the door of the device is open. The door has a trench with side walls, between which a sheet of the paper becomes trapped by a plate when the door is closed so as to ensure that it is properly positioned for operation. When the door closes, the end sheet of the paper is pressed against a thermal print head by a drive roller. A latch mechanism keeps the door releasably closed by means of a pivoted lever which has an end projection that is spring biased into a receiving groove when the door closes. The drive roller is belt driven by a motor. Two belts are provided which have an end wrapped around gear wheels on a pivot shaft of the door for transmitting rotary motion. The paper pack lies horizontally and does not stand upright in the tray.

U.S. Pat. No. 4,218,031 discloses a zigzag paper pack loaded into a V-shaped trough compartment of a feed mechanism. A drive roller with pins pulls the paper out from the pack out of the compartment in a generally horizontal direction. Nothing guides the paper to enable pulling the paper from either side of the pack without mishap.

U.S. Pat. Nos. 4,139,855; 4,296,420; 4,348,118; 4,567,492 and 4,631,552 all disclose zigzag paper feed mechanisms in which the zigzag paper pack is laid down horizontally for feeding from its top only, rather than standing upright vertically for feeding from either side.

U.S. Pat. Nos. 2,718,450 and 3,216,021 disclose feed mechanisms for feeding paper on a paper roll in either the clockwise or counterclockwise directions, but always by pulling on the outside sheet of the paper roll. No zigzag paper is used and no paper retention pocket in a door is utilized. Also, no biasing means is present between the paper roll and the drive roller.

SUMMARY OF THE INVENTION

The present invention is directed to a bidirectional feed device of a printer for feeding zigzag paper from either side of a zigzag paper pack without mishap.

One aspect of the invention resides in a feed device that has a paper retention pocket for holding a zigzag paper pack and a drive roller for pulling the zigzag paper out of the paper retention pocket. The zigzag paper is directed upward above a base of the pocket and then directed to the drive roller so that either side of the zigzag paper pack can be pulled out one sheet at a time in a continuous manner.

Another aspect of the invention resides in a method of feeding zigzag paper in which zigzag paper is pulled out of a paper retention pocket and directed above the base of the pocket so that either side of the zigzag paper pack can be fed.

Preferably, guide elements are provided over the pocket and include a biasing element to create paper tension to a drive roller, which pulls the paper. One optical sensor is positioned above the paper path and detects that the end of paper is approaching by viewing special cue dots at the pack end. A second sensor determines if the paper is actually there.

In addition, provision can be made to compensate for drive roller tolerances by permitting the print head to not only move towards and away from the drive roller but also to rock either left or right. The optical sensor can also rock with the drive roller so as to be aligned parallel to the paper.

In order to facilitate alignment of the drive roller shaft and a latch into their proper position when the door is closed, alignment holes are provided in the housing on both sides.

BRIEF DESCRIPTION OF THE DRAWINGS

While the scope of the invention will be pointed out in the appended claims, for a better understanding of the present invention, reference is made to the following description and accompanying drawings, wherein:

DESCRIPTION OF THE PREFERRED EMBODIMENT

Figure 1:
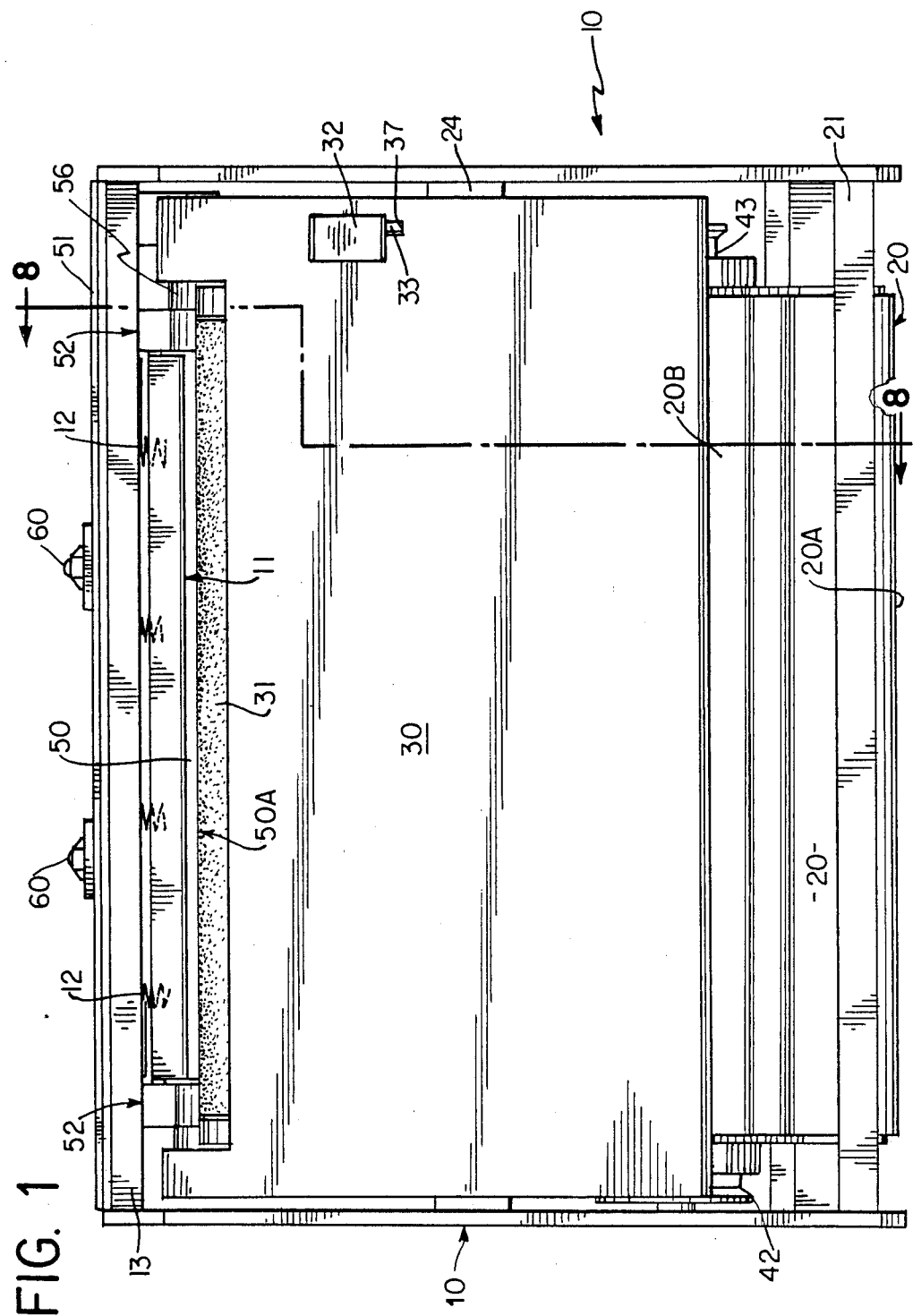
FIG. 1 shows a partially broken front view of the present invention with the door in the closed position.

Turning now to the drawings, FIGS. 1-4 show a door 30, which is pivotally connected to a housing 10. A print head support 11 is shown biased by springs 12 extending off a pivot bar 13. The pivot bar 13 is fixed to the housing 10.

A drive roller 31 is driven by a motor 40 via a transmission system. The transmission system includes a belt 42 wrapped around wheels on a motor shaft 41 and a door pivot shaft 22 and also includes a belt 43 wrapped around wheels on the door pivot shaft 22 and drive roller shaft 44. Thus, rotation of the motor 40 rotates the motor shaft 41 and thereby the belts 42, 43. Belt 42 is tensioned by moving the motor mounts and motor via slots, and belt 43 has an idler tension mechanism 38 which is adjustable for tensioning the belt to ensure that the belt is tensioned during operation.

Figure 2:
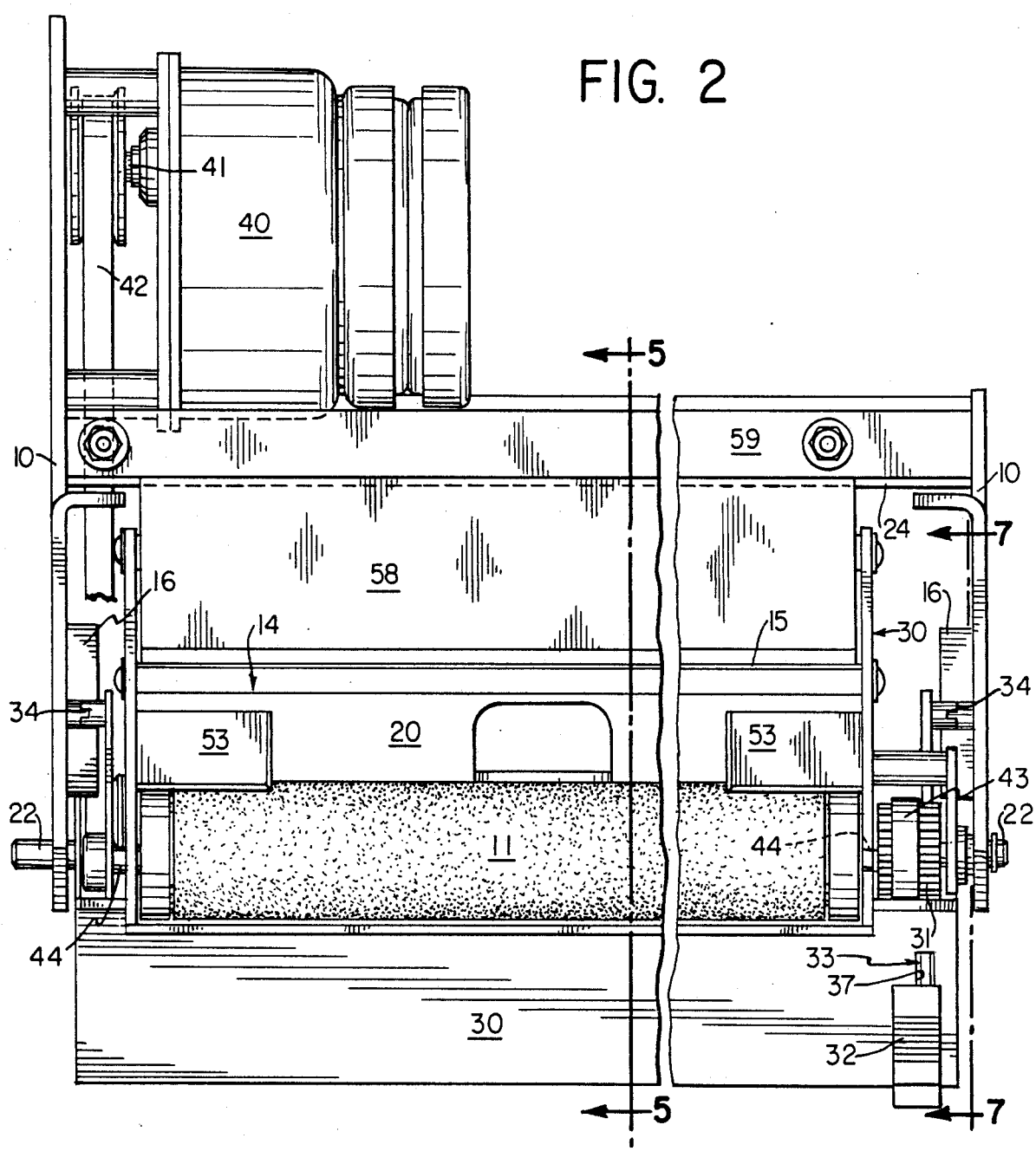
FIG. 2 shows a top view of FIG. 1, but with the print head and associated supports removed.
Figure 3:
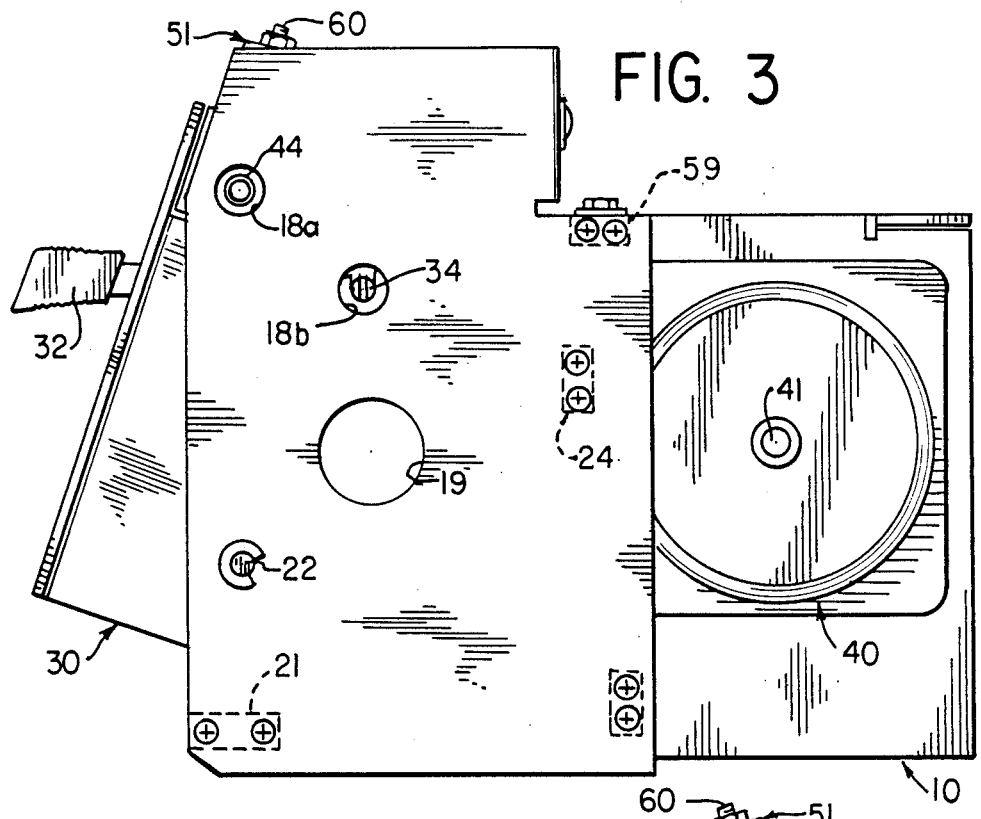
FIG. 3 shows a left side elevational view of FIG. 2.
Figure 4:
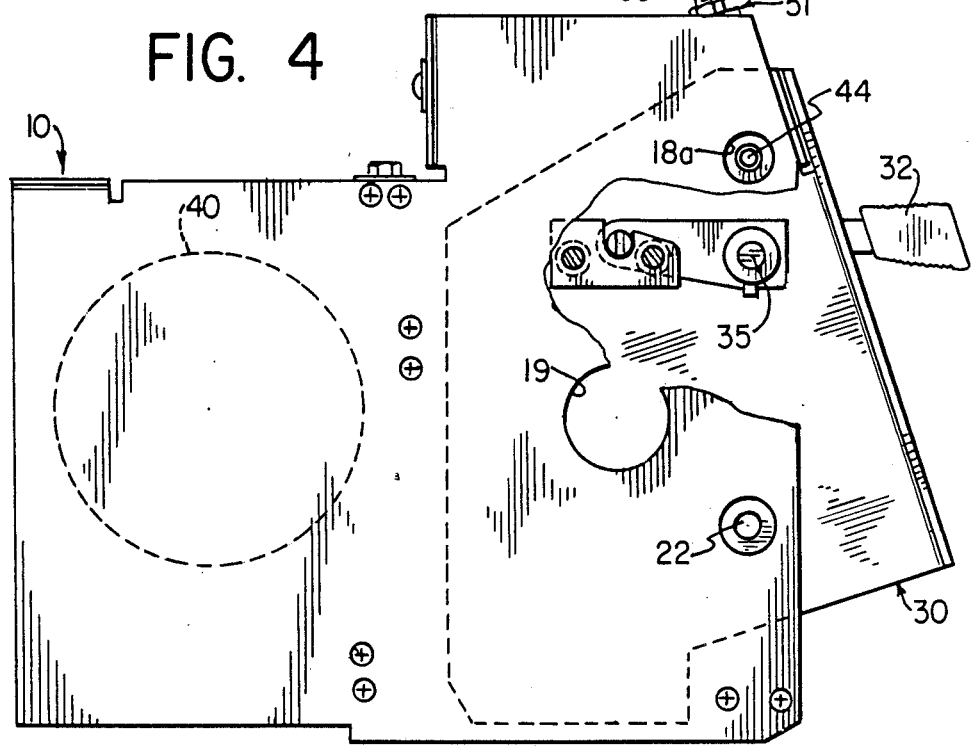
FIG. 4 shows a partially broken right side elevational view of FIG. 2.
Figure 7:
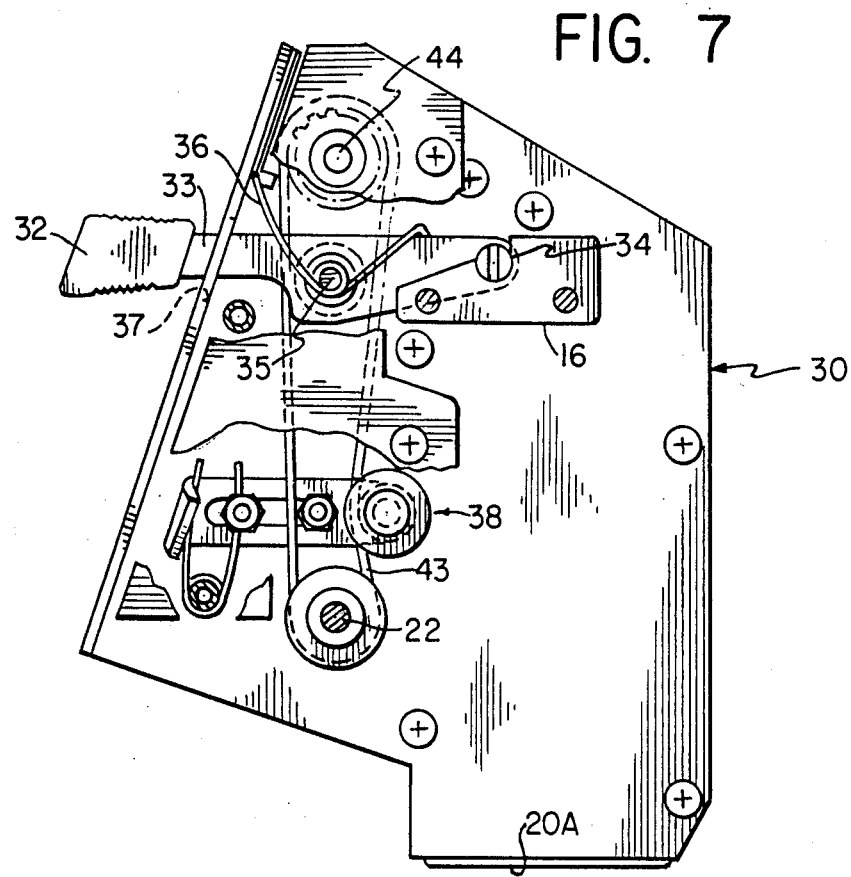
FIG. 7 shows a cross-section substantially taken across section lines 7—7 of FIG. 2.
Figure 8:
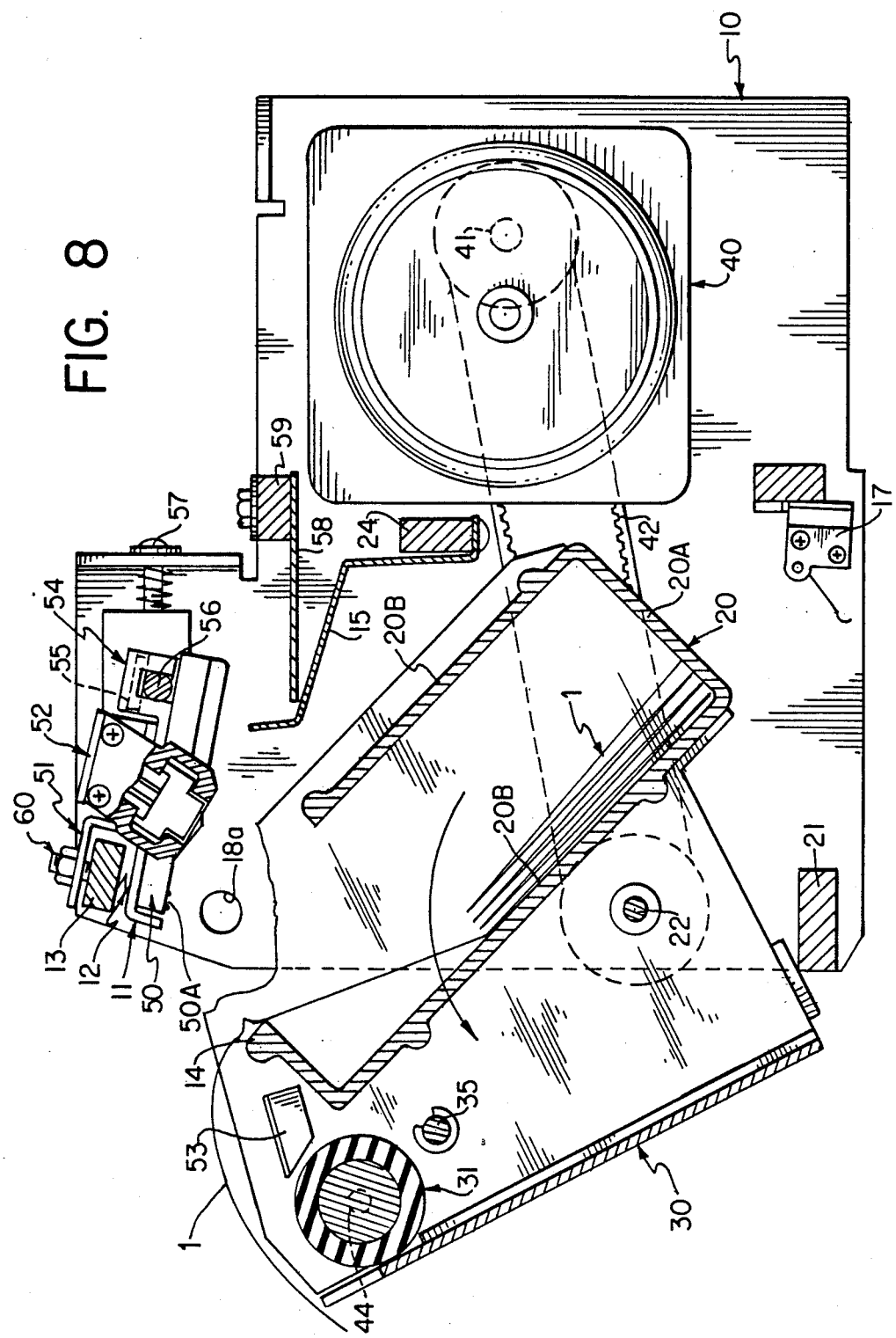
FIG. 8 shows a cross-section substantially taken across section lines 8—8 of FIG. 1, except that the door is shown in the open position.

FIGS. 2 and 7 show a latch member 33 with a projection 34 extending in a groove of a latch receiving member 16 when the door 30 is closed. The latch member 33 is pivoted to the door 30 via a pivot 35. To open the door 30, the handle 32 is pushed downward, pivoting the latch member 33 to move the projection 34 out of the groove. Once unlatched, the door 30 opens manually or by its own weight. An open door position is shown in FIG. 8. A torsion spring 36 biases on the latch pivot 35 to keep the latch closed. The latch 33 is restricted by stops which define edges of a slot 37 on the front plate.

Figure 5:
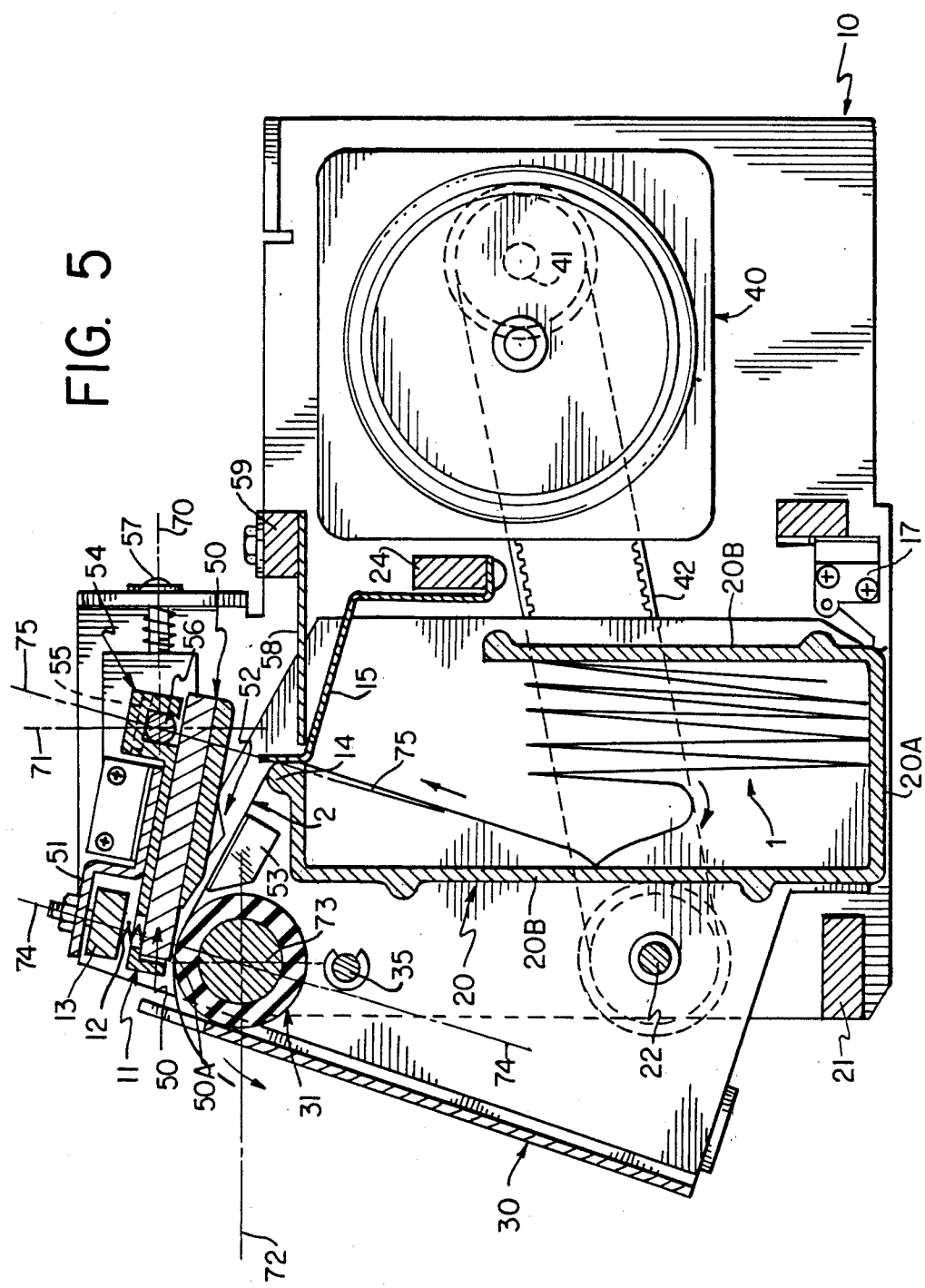
FIG. 5 shows a cross-section substantially taken across section lines 5—5 of FIG. 2 with the paper pack in position for bottom feeding.

FIG. 5 shows the door 30 having a paper retention pocket 20, which has a base 20A and two substantially parallel sidewalls 20B which are substantially perpendicular to base 20A. A zigzag paper pack 1 is in the pocket 20, positioned for bottom feeding and which leans against one of the sidewalls 20B. The paper is fed one sheet at a time by the drive roller 31, guided upward first between a drag spring 15 and a rounded guide element 14. The drag spring 15 is connected to a support 24 of the housing 10 and the rounded guide element 14 extends from an upper end of the pocket sidewall 20B as shown. The zigzag paper is perforated every 9 cm. and folded back on itself so that it can be pulled out in a continuous manner.

The drag spring 15 biases against the guide element 14 through the paper, creating paper tension between the drive roller 31 and drag spring 15 so that the paper 2 lies in a straight plane. A print head 50 is held by the support plate 11 opposite the drive roller 31. A plate 58 extends from a support 59 to the drag spring 15 in the vicinity of the opposite side of an end area of the drag spring that biases against the guide element 14. This plate helps in aligning the drag spring when the door assembly is closed and further limits the drag spring motion. The support 59 is secured to the housing 10.

Referring to FIG. 8, which shows the door 30 open, the paper retention pocket 20 is accessible for insertion of a zigzag paper pack. In the open position, the rounded guide element 14 and the drag spring 15 are separated from each other and the drive roller 31 and the print head 50 are separated from each other. The door pivots about pivot shaft 22. A travel stop limiter is provided by the cooperation of the springs 12 biasing from the pivot bar 13.

When the door 30 is closed into the position of FIG. 5, the rounded guide element 14 is brought to the drag spring 15 and the drive roller 31 is brought to the print head 50. The print head 50 biases against an end sheet of the zigzag paper 2 in opposition to the drive roller 31 by means of the springs 12 tangentially at the thermal fingers of the print head 50. The drag spring 15 biases against this end sheet at another location in opposition to the rounded guide element 14.

Also, a switch 17 closes a motor drive circuit (not shown), enabling motor operation when the door is closed. To close this circuit, a conductive element can be pushed or brought into contact with switch terminals by the pocket sidewall upon closure of the door.

End sheets of the zigzag paper pack are extended to lie against the rounded guide element 14 and drive roller 31 and can stick out of the pocket 30 as shown. Thus, when the door is closed, the end sheets are already in position for immediate feeding and printing thereon. By virtue of being guided upward between the rounded guide element 14 and drag spring 15, the paper can be fed for either the top or bottom (see FIGS. 5 and 6) without any mishap occurring during operation. In other words, at most one sheet at a time is assured of leaving the pocket at any one time when driven by the drive roller 31.

A print head travel limiter includes an adjustable jam nut 60 and limiting stop 51 located at two places above the pivot bar 13 to limit the down travel of the print head 50 when the door opens and the drive roller 31 swings out. The limiting stop 51 is attached to the print head support plate 12.

The drag spring 15 creates paper tension in the zigzag paper between the drag spring 15 and the drive roller 31. The paper surface is sensed by first and second optical sensing devices 52 which are identical to each other, except that the first enables early detection of the end of the zigzag paper via detection of black squares near the end of the paper and the second detects the end of the paper to provide a signal to stop operation of the motor 40. The absence of paper (e.g. the paper runs out) is detected by the second sensing device which is on the opposite side as the first. A warning indication is made to notify the user the end of the zigzag paper is approaching or that the paper is out. In addition to its role in tensioning the paper, the drag spring 15 prevents more than one sheet from the zigzag paper pack at one time from emerging out of the pocket 20 so that the drag spring 15 plays a dual role.

The second optical sensing device is used to detect the end of the paper or the absence of paper (after the first optical sensing device 52 provides early detection of the approaching end). Upon making such a detection, a signal is sent to the motor drive circuitry (not shown) so as to stop the motor and thereby stop any further movement of the drive roller. The circuitry also prevents the thermal print head 50 from printing directly against the drive roller 31 without any paper being present in between.

Also provided are blocks 53, which are arranged opposite both optical sensing devices when the door 30 is closed. The blocks 53 are connected to the door and thereby swing with the door. The blocks 53, which are black, prevent outside light from creating a false signal when the optical sensing devices are detecting paper presence or paper and dots. The size of the gap between the optical sensing devices 52 and their respective blocks 53 can be adjusted by holding screws to optimize the focal distance for detection.

It is also pointed out that instead of two optical sensing devices for providing an early warning and for stopping the drive roller from pulling the paper any further, a single optical sensing device could be used to perform both functions, requiring more complicated circuitry. Other alternatives could similarly be employed to stop the drive roller after the early warning is given by an optical sensor, such as using a timing device to count up to a predetermined period of time or a device for counting up to a predetermined number of revolutions of the drive roller. Further, other well-known paper detecting systems other than optical sensors could be used.

As drive roller 31 pulls the paper out of the paper retention pocket 20, the paper is directed between the drag spring 15 and rounded guide element 14. The drag spring 15 and the rounded guide element 14 are located directly above the base 20A of the paper retention pocket 20 and are at a predetermined elevation higher than that reached by the zigzag paper pack in an upright position standing on the base of the paper retention pocket. This arrangement provides for the directing of the zigzag paper from either side of the zigzag paper pack (see FIGS. 5 and 6) without mishap, since the paper is directed upward and centrally over the base 20A.

Figure 6:
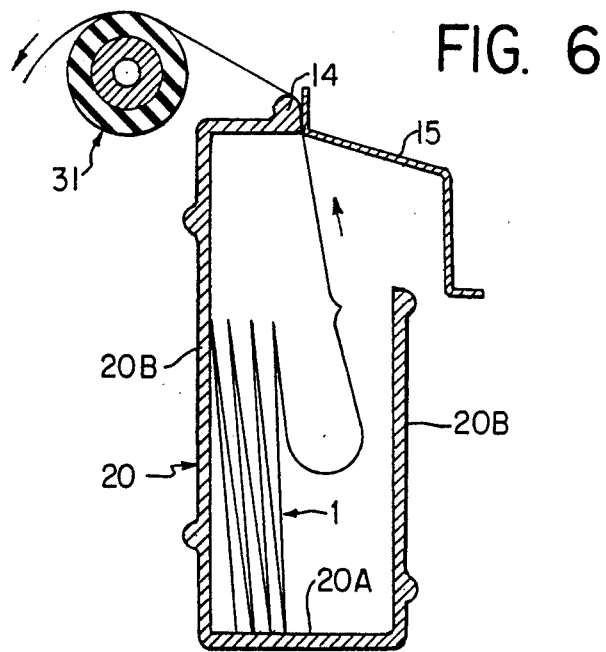
FIG. 6 shows a cross-section similar to that of FIG. 5, except that fewer components are shown and the paper pack is shown in position for top feeding with its paper being pulled from the opposite side from that of FIG. 5.

The zigzag paper is made out of sturdy paper stock so that as it is pulled out of the pocket, the paper unfolds or loops at one side of the paper pack. This unfolding action causes the paper pack to lean against the sidewall 20B that is away from the unfolding side of the paper pack as shown in FIGS. 5 and 6.

While the drag spring 15 could be replaced by a spring attached to an intermediate member so as to bias the member against the rounded guide element, it is preferable to have simply a drag spring so as to reduce the number of components required and simplify construction. It is also preferable to form the guide element 14 to have a rounded outer surface, but other variations in shape are also usable. Further, the rounded section could be in the form of a freely rotatable roller.

Referring to FIG. 5, a pivot bar 51 is provided over the print head 50 to allow the print head to rock to the left and right so as to compensate for the drive roller 31 tolerances. Thus, if the drive roller 31 is installed slightly misaligned, the print head 50 will pivot to compensate. Further, the optical sensing devices 52 are secured to this pivot bar so that they too can rock to the left and right so as to maintain its parallelism with the paper.

The print head support plate 11 has a U-shaped end 54, in which is held a pivot pin 55 spanning the distance between the legs of the U-shaped end. A shaft 56 extends in the U-shaped end 54 against the pivot pin 55. The shaft 56 is adjustable by two adjustment screws 57, each screw being on an opposite side of the support.

Adjustment of the print head with respect to the position of the drive roller will be explained with respect to imaginary axes 70–73 passing through the radial center of the drive roller 31 and the shaft 56. The X—X axis 70 through the shaft 56 would extend through the centerline of the adjustment screw 57. The Y—Y axis 71 would extend perpendicular to the X—X axis 70. A parallel axis system 72, 73 would extend through the drive roller 31. A tangent angle plane 74 extends through the drive roller longitudinally, passing through the radial center of the drive roller and the peripheral area of tangency of the drive roller with the thermal fingers 50A of the print head 50. A parallel angle plane 75 can be drawn through the shaft 56 longitudinally and through its radial center.

Shaft 56 is adjustable in the X—X direction by the adjustment screws 57. The springs 12 keep the print head 50 in position until the shaft 56 can be clamped into position. The pivot pin 55 allows the print head 50 to pivot in a direction perpendicular to the parallel angle plane. This permits the print head 50 to assume the same tangent plane as that of the drive roller 31. The roller angle is set by adjusting at the alignment holes through the door side plates and the print head tilts to this setting. When the drive roller is set into its tangent position, the optical sensing devices 52 have faces which are parallel to the tensioned paper path, which extends between the drag spring !5 and the drive roller 31, and the tangent roller position. The roller tangent position maintains the print head position as long as the roller is tangent. This position allows the printhead fingers to print at the tangent point.

The drive roller 31 and shaft 56 are parallel to each other within a certain tolerance. The pivot pin 55 allows the print head to adjust away this tolerance.

The pocket 20 is formed of extruded metal and has a depth between its front and rear faces that is about three times greater than the thickness of the zigzag paper pack. This enables sufficient space in the pocket for the zigzag paper pack to tilt in either direction depending upon whether it is to be top or bottom fed. The pocket is sized to accommodate the zigzag paper pack without the necessity for further adjustment of the pocket, as was the case for prior art pockets. The zigzag paper pack fits snugly between opposing sidewalls of the pocket so that the paper will remain in proper alignment throughout the process of feeding the paper from the pack by means of the drive roller 31.

The housing 10 has pairs of alignment holes 18a, 18b on opposite side plates of the housing, each pair respectively being arranged for alignment with the critical centers of drive roller shaft 44 and the door latch member projection 34 when the door closes. Alignment hole 18b helps facilitate positioning of the latch projection 34 into proper alignment in its latch receiver groove during assembly. Alignment hole 18a helps facilitate positioning of the drive roller shaft into proper alignment during assembly so that the print head 50 biases against the drive roller 31. An access opening 19 through the housing is also provided to facilitate adjustment of components during assembly.

Further, the preferred embodiment employs a print head with thermal fingers, but other well known printing mechanisms could be substituted without departing from the spirit of the invention.

In addition, where one element is being pressed against the other, either or both elements could be doing the pressing. Further, each element could be switched at the other's location. For instance, the guide element 14 and drag spring 15 could be switched with each other.

As described, the present invention provides for easy loading of the zigzag paper pack by simply inserting the pack into a pocket in a door and then closing the door, which automatically positions the paper for feeding from either side of the zigzag paper pack.

While the foregoing description and drawings represent the preferred embodiments of the present invention, it will be understood that various changes and modifications can be made without departing from the true spirit and scope of the present invention.

What is claimed is:

1. A feed apparatus for zigzag paper pack, comprising:
   a paper retention pocket having a base and having sidewalls extending into respective planes from said base so that the zigzagpaper pack may be accommodated to stand upright on said base and between said sidewalls, said planes being no wider than the base from which said planes extend;
   means for pulling the zigzag paper from the zigzag paper pack out of said paper retention pocket; and
   means for directing the zigzag paper from said paper retention pocket to said pulling means and for tensioning the zigzag paper, said directing and tensioning means being arranged between said planes and over said base and above predetermined height to which the zigzag paper is to extend to stand upright on said base.

2. The apparatus as defined in claim 1, wherein said directing and tensioning means includes a guide member and a biasing means, said biasing means being formed to bias the zigzag paper against said guide member so as to create tension in the zigzag paper between said biasing means and said pulling means and to prevent more than one sheet of the zigzag paper at any one time from leaving said pocket.

3. The apparatus as defined in claim 2, wherein said biasing means is a drag spring having a single piece construction.

4. The apparatus as defined in claim 1, wherein said pulling means includes a roller and means for driving said roller.

5. The apparatus as defined in claim 1, wherein said directing means includes two cooperating elements, further comprising:
   a door having said paper retention pocket, said pulling means and one of said two cooperating elements of said directing means;
   a housing having the other of said two cooperating elements of said directing means; and
   means for pivoting said door to said housing so that said door can swing from an open position, in which said paper retention pocket is accessible from outside, to a closed position, in which said two cooperating elements are brought together for creating tension in a portion of the zigzag paper extending between said cooperating elements and said pulling means.

6. The apparatus as defined in claim 5, wherein said pulling means opposes a printing means of said housing when said door is in said closed position so that the zigzag paper travels between said pulling means and said printing means.

7. The apparatus as defined in claim 5, wherein said two cooperating elements are a guide member and a biasing member, said biasing member biasing against said guide member.

8. The apparatus as defined in claim 2, further comprising:
   means for indicating an absence of the paper under said tension.

9. The apparatus as defined in claim 8, wherein said indicating means includes means for indicating when a portion of the paper under said tension reaches a predetermined position.

10. The apparatus as defined in claim 9, wherein said detecting means includes optical sensors.

11. The apparatus as defined in claim 5, wherein said pulling means includes a roller, said housing having means for facilitating alignment of said roller.

12. The apparatus as defined in claim 11, further comprising:
    latch means for releasably holding said door to said housing in said closed position, said housing further having means for facilitating alignment of said latch means.

13. The apparatus as defined in claim 5, further comprising:
    means for compensating for tolerances in alignment of said roller, said compensating means including pivot means for pivoting said printing means relative to said roller.

14. The apparatus as defined in claim 13, wherein said directing means includes a guide member and a biasing means, said biasing means being formed to bias the zigzag paper against said guide member so as to create tension in the zigzag paper between said biasing means and said pulling means, further comprising:
    means for sensing paper condition, said sensing means being movable with said printing means.

15. The apparatus as defined in claim 5, wherein said paper retention pocket has sidewalls facing each other and spaced apart from each other such that the zigzag paper pack fits into said pocket between said sidewalls and is aligned beneath said directing means when said door is in said closed position.

16. A method of feeding zigzag paper, comprising the steps of:
    standing a zigzag paper pack upright vertically in a paper retention pocket having sidewalls extending in respective planes from a base of the pocket, the planes being no wider than the base from which the planes extend;
    pulling the zigzag paper out of the pocket from either side of the pack; and
    directing the zigzag paper to a guide element directly above a base of the pocket and tensioning the zigzag paper at the guide element, the guide element being between the respective planes.

17. The method as defined in claim 16, further comprising:
    closing a door which has the pocket before commencing the pulling, the closing causing the paper to become positioned for the step of directing and the step of pulling.

18. The method as defined in claim 16, further comprising:
    tensioning the paper by the step of pulling;
    sensing a pressure and an absence of the paper being pulled out of the pocket; and
    indicating in response to the step of sensing.

19. The method as defined in claim 18 further comprising:
    detecting the end of the paper; and
    stopping the step of pulling in response to the step of detecting.

20. The method as defined in claim 16 further comprising:
    biasing the zigzag paper against the guide element so as to both tension the zigzag paper during the step of pulling and to prevent more than one sheet of the zigzag paper at any one time from leaving the pocket.

21. The method as defined in claim 20, further comprising:
   latching the door closed, the step of biasing taking place in response to the step of latching.

22. A feed apparatus for a zigzag paper pack in combination with the zigzag paper pack, the feed apparatus comprising:
   a paper retention pocket having a base and sidewalls extending into respective planes from said base, the zigzag paper pack standing upright on said base and between said sidewalls the planes being no wider than the base from which the planes extend;
   means for pulling the zigzag paper from the zigzag paper pack out of said paper retention pocket; and
   means for directing the zigzag paper from said paper retention pocket to said pulling means and for tensioning the zigzag paper, said directing and tensioning means being arranged between said planes and over said base and above a predetermined height to which the zigzag paper is to extend to stand upright on said base, all of said zigzag paper thereby being pullable out of said pocket one sheet at a time by said pulling means regardless of a side of the zigzag paper pack from which the zigzag paper is being pulled.

23. The apparatus as defined in claim 1, wherein said guide element is an integral part of said pocket.

24. The apparatus as defined in claim 1, wherein said directing means comprises two directing element, said directing elements extending toward each other between said planes and providing a space between them through which the paper is to be directed.

25. The apparatus as defined in claim 22, wherein said directing means comprises two directing elements, said directing elements extending toward each other between said planes and providing a space between them through which the paper is to be directed.

* * * * *